US009631800B2

(12) United States Patent
Coughlin et al.

(10) Patent No.: US 9,631,800 B2
(45) Date of Patent: Apr. 25, 2017

(54) COMPRESSIBLE DECORATIVE STRUCTURE

(71) Applicant: Plow & Hearth, LLC, Madison, VA (US)

(72) Inventors: Janice M. Coughlin, Charlottesville, VA (US); Tere Eggleston, Richmond, VA (US)

(73) Assignee: PLOW & HEARTH, LLC, Madison, VA (US)

(*) Notice: Subject to any disclaimer, the term of this patent is extended or adjusted under 35 U.S.C. 154(b) by 309 days.

(21) Appl. No.: 14/487,496

(22) Filed: Sep. 16, 2014

(65) Prior Publication Data

US 2015/0077980 A1  Mar. 19, 2015

Related U.S. Application Data

(60) Provisional application No. 61/878,291, filed on Sep. 16, 2013.

(51) Int. Cl.
F21L 13/00 (2006.01)
F21V 21/14 (2006.01)
(Continued)

(52) U.S. Cl.
CPC ............... F21V 21/14 (2013.01); F21S 9/03 (2013.01); F21V 17/007 (2013.01);
(Continued)

(58) Field of Classification Search
CPC .... F21S 9/03; F21S 9/032; F21S 9/035; F21S 9/037; F21V 17/007; F21V 17/08; F21V 21/0824; F21V 21/14; F21V 21/16; F21V 21/18; F21L 4/06; F21L 4/08; F21W 2131/10; F21W 2121/00; Y02B 10/10
See application file for complete search history.

(56) References Cited

U.S. PATENT DOCUMENTS 3,135,066 A   6/1964 Scherer
3,162,377 A  12/1964 Ozeki
(Continued)

FOREIGN PATENT DOCUMENTS

CN    201672276     12/2010
JP    3068753 B2  *  7/2000

OTHER PUBLICATIONS

Allsop Inc "Allsop Home & Garden—Solar Lanterns", www.allsopgarden.com/solar-lanterns/, accessed Mar. 18, 2013.
(Continued)

Primary Examiner — Y M Lee
(74) Attorney, Agent, or Firm — Goodman Allen Donnelly PLLC; Matthew R. Osenga, Esq.

(57) ABSTRACT

A compressible decorative structure can be easily converted from a non-compressed configuration to a compressed configuration. The structure includes an inner support that is attached to a base. A movable ring slides along the inner support and is held in the compressed configuration by retaining clips. Naturally biased connectors, formed of a flexible material, return the structure to its non-compressed configuration when the retaining clips are disengaged. Alternatively, the structure includes a rope and a top cover that engages the rope. Springs hold the structure in the desired configuration.

17 Claims, 22 Drawing Sheets

(51) Int. Cl.
*F21S 9/03* (2006.01)
*F21W 131/10* (2006.01)
*F21W 121/00* (2006.01)
*F21V 17/00* (2006.01)
*F21V 21/08* (2006.01)
*F21Y 101/00* (2016.01)

(52) U.S. Cl.
CPC ...... *F21V 21/0824* (2013.01); *F21W 2121/00* (2013.01); *F21W 2131/10* (2013.01); *F21Y 2101/00* (2013.01); *Y02B 10/10* (2013.01)

(56) References Cited

U.S. PATENT DOCUMENTS

| | | | |
|---|---|---|---|
| 5,203,281 | A | 4/1993 | Harwich |
| D357,332 | S | 4/1995 | Kay |
| 5,629,057 | A | 5/1997 | Wang et al. |
| 6,047,661 | A | 4/2000 | Lush |
| 6,073,582 | A | 6/2000 | Lush |
| 6,284,330 | B1 | 9/2001 | Hermanson |
| 6,474,843 | B2 | 11/2002 | Shieh |
| D486,272 | S | 2/2004 | Donegan |
| 6,769,793 | B2 | 8/2004 | Hornsby et al. |
| D500,876 | S | 1/2005 | Bucher et al. |
| 6,960,004 | B1 | 11/2005 | Hsieh |
| D526,083 | S | 8/2006 | Holman |
| 7,185,605 | B1 | 3/2007 | Lush |
| D542,960 | S | 5/2007 | Peterson |
| D544,637 | S | 6/2007 | McMinn |
| D563,584 | S | 3/2008 | Lee et al. |
| 7,513,638 | B2 | 4/2009 | Allsop et al. |
| D620,636 | S | 7/2010 | Holder |
| D621,536 | S | 8/2010 | Lee |
| D622,430 | S | 8/2010 | Chilton |
| 7,954,264 | B1 | 6/2011 | Jost |
| 8,033,694 | B2 | 10/2011 | Fett et al. |
| D650,104 | S | 12/2011 | Brands et al. |
| 8,192,044 | B2 | 6/2012 | Allsop et al. |
| 8,356,926 | B1 | 1/2013 | Sanders |
| D689,015 | S | 9/2013 | Hawkins |
| D698,990 | S | 2/2014 | Chen |
| D703,365 | S | 4/2014 | Martin |
| D727,556 | S | 4/2015 | Arslan |
| 9,080,736 | B1 | 7/2015 | Salzinger et al. |
| 2003/0150391 | A1 | 8/2003 | Rich |
| 2007/0183143 | A1* | 8/2007 | Allsop ................. F21S 9/037 362/183 |
| 2010/0097812 | A1* | 4/2010 | Cheng .................... F21S 4/10 362/382 |
| 2012/0224359 | A1 | 9/2012 | Chun |

OTHER PUBLICATIONS

Smart Solar Inc, "Chinese Solar Lanterns", Aug. 25, 2010.
Evergreen LLC, "Evergreen Flag and Garden—Spring-Summer 2011 Garden Catalog", Catalog, Summer 2011.

* cited by examiner

COMPRESSIBLE DECORATIVE STRUCTURE

CROSS-REFERENCE TO RELATED APPLICATION

This application claims the benefit of U.S. Provisional Application No. 61/878,291, filed Sep. 16, 2013, the contents of which are incorporated herein by reference.

FIELD OF THE INVENTION

The field of the invention generally relates to decorative structures. More specifically, the invention relates to a compressible decorative structure.

BACKGROUND OF THE INVENTION

Decorative shapes can be used for many purposes both inside and outside the home. Commonly, decorative shapes are combined with other features in order to provide a decorative object that has the benefits of certain desired features. Decorative objects are often used to decorate a yard or other outside area. Some examples of such decorative objects include solar powered lanterns. Other examples of such decorative objects may include a bird feeder implemented within a decorative shape.

U.S. Pat. No. 8,356,926 discloses an inflatable externally lighted decoration that provides an inflatable decorative body with lights attached to the outer surface of the body by wire separators. The decorative body may be collapsed for storage and transport by deflating the body. The inflation of the decorative body provides the support for the lights as the wire separators are attached directly to the inflatable body.

U.S. Pat. No. 6,474,843 discloses a globular decorative light assembly with a flexible supporting frame. This assembly is formed of a metal-wire light sphere frame that includes flexible supporting sticks that are attached to top and bottom rings. A pulling rope passes through the top ring and is attached to the bottom ring. The assembly is compressible and expandable by pulling or releasing the pulling rope. The 843 patent seeks to specifically avoid the use of any rigid central supporting posts, opting for the pulling rope to compress and expand the assembly. The connections between the top and bottom rings and the flexible supporting sticks are with revolute joints that each have a single degree of freedom of movement.

Along with the need for various decorative objects having attractive decorative shapes, there is a need to keep costs of transport, packaging, and storage at a minimum while maximizing the quality, durability, and attractiveness of the decorative objects. There is a need for a compressible decorative shape of durable design that is capable of being integrated with additional features. Additionally, there is a need for a compressible decorative shape that is intended to be used in either a compressed or non-compressed configuration.

SUMMARY OF THE INVENTION

The invention relates to various exemplary embodiments, including articles, decorative shapes, decorative objects, and decorative objects combined with functional features.

These and other features and advantages of the invention are described below with reference to the accompanying drawings.

DETAILED DESCRIPTION

Figure 1:
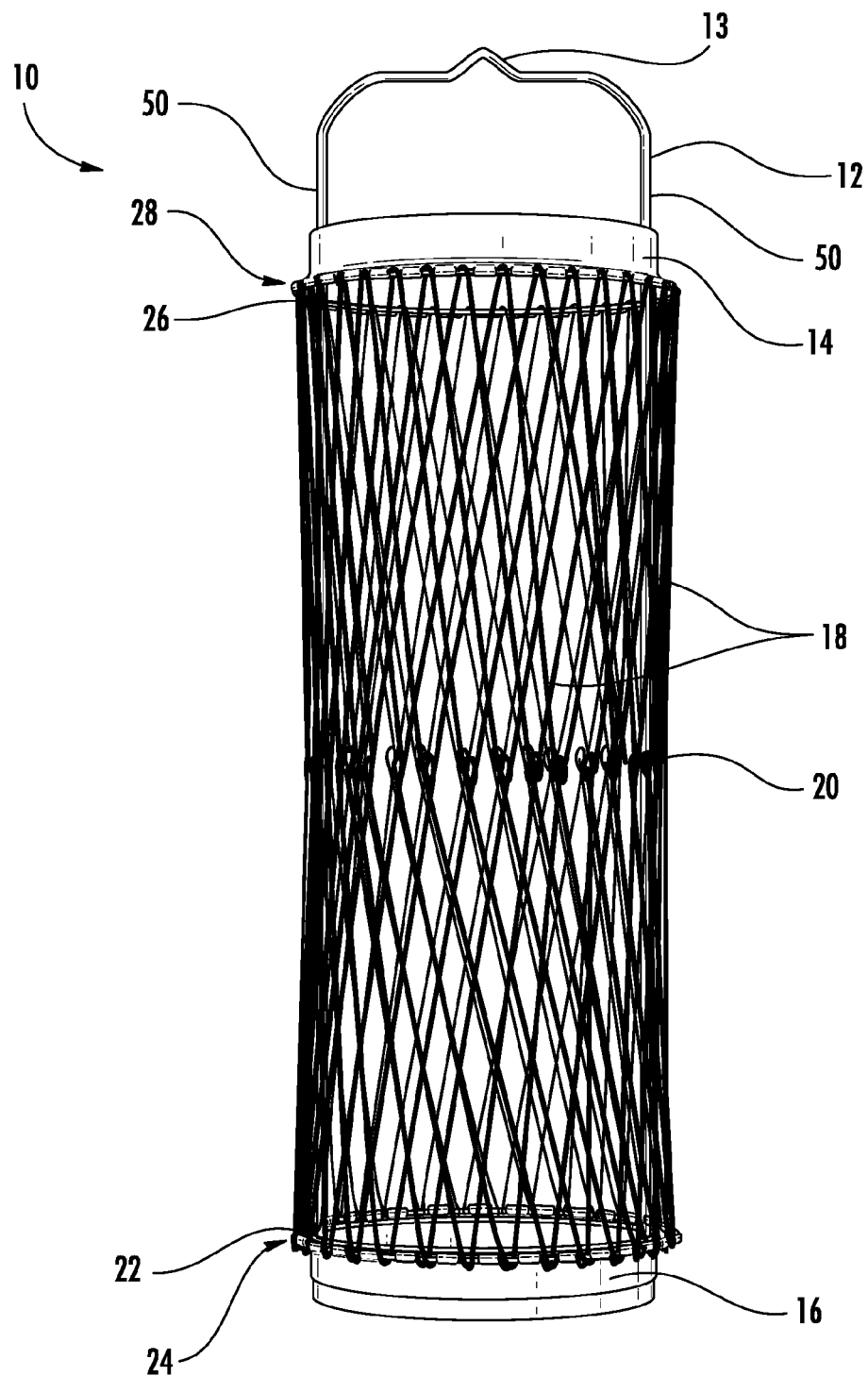
FIG. 1 is a perspective view of an embodiment of the compressible structure in a non-compressed configuration.

The following description is merely exemplary in nature and is not intended to limit the present disclosure, application, or uses. It should be understood that throughout the drawings, corresponding reference numerals indicate like or corresponding parts and features.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

A number of materials are identified as suitable for various aspects of the compressible decorative structure. These materials are to be treated as exemplary and are not intended to limit the scope of the claims. Although any methods and materials similar or equivalent to those described herein can also be used in the practice or testing of the present invention, a limited number of the exemplary methods and materials are described herein.

It will be understood by those having ordinary skill in the art that the various shapes, openings, and cavities as described herein may be made through any applicable manufacturing technique or combinations of techniques, such as, but not limited to, casting, forging, drawing, turning, welding, cutting, drilling, injecting, reaming, or other techniques, regardless of the terminology used in describing those shapes, openings, apertures, or cavities.

Unless otherwise noted, the drawings of the present application are not necessarily drawn to scale. They demonstrate the basic relationship of the constituent parts, but not necessarily their respective sizes.

It must be noted that, as used herein and in the appended claims, the singular forms "a", "an", and "the" include plural referents unless the context clearly dictates otherwise.

Referring to FIG. 1, a compressible structure 10 is shown in a non-compressed configuration. The compressible structure 10 includes a base 16, an inner support 12, and a movable ring 14. The base 16 and movable ring 14 are generally round in shape. The base 16 and movable ring 14 may be generally polygonal in shape and may be different in shape from one another (not shown). Substantial portions of the inner support 12 and the base 16 may be formed from a single piece of material (not shown). The inner support 12 may be secured to the base 16. The inner support 12 is made of a slightly pliable material, such as thin, flat metal, plastic, or the like. The inner support 12 should be rigid enough to provide strong support, but flexible enough so that a user can press the legs 50 of the inner support 12 together slightly, as described in greater detail below. While inner support 12 has been shown having two legs 50, it will be understood that inner support 12 may include more than two legs 50. The inner support 12 may include a hanging point 13 from which the compressible structure 10 may be hung. The inner support 12 may be permanently attached to the base 16, such as by welding or adhesives, or may be attached with fasteners, such as screws, rivets, or the like.

The compressible structure 10 further includes a plurality of connectors 18, each having a first end 22 attached the base 16 and a second end 26 attached to the movable ring 14. The first end 22 of each connector 18 is attached to the base 16 along the base attachment circumference 24 in a manner that allows for zero degrees of translational freedom and at least two degrees of rotational freedom. The second end 26 of each connector 18 is attached to the movable ring 14 along the movable ring attachment circumference 28 in a manner that allows for zero degrees of translational freedom and at least two degrees of rotational freedom.

As used herein, all reference to degrees of freedom is made with regards to standard degrees of freedom of a mechanical system (i.e., not chemical degrees of freedom or other non-mechanical degrees of freedom). For reference, these standard degrees of freedom are discussed in the following two paragraphs.

As used herein, the term degrees of translational freedom indicates one object s ability to move, without rotation (for example, sliding), with respect to another object. The number of degrees of translational freedom corresponds to the number of orthogonal directions in which the object may be moved. For example, a push-button may be an object with one degree of translational freedom with respect to the object in which the push-button is installed because the push-button may move in only a single orthogonal direction: in/out. For another example, a helicopter may be an object with three degrees of translational freedom with respect to the earth because the helicopter may move in any of the three orthogonal directions: up/down, north/south, and east/west.

As used herein, the term degrees of rotational freedom indicates one object s ability to change orientation (i.e., rotate) with respect to another object without moving towards or away from the other object. The number of degrees of rotational freedom corresponds to the number of rotational axes about which the object may rotate with respect to the other object. For example, a door may have one degree of rotational freedom because it is able to rotate about only a single rotational axis: rotation about its hinges. For another example, an airplane may have three degrees of rotational freedom because it is able to rotate about any of three axes represented by pitch, yaw, and roll.

Figure 2:
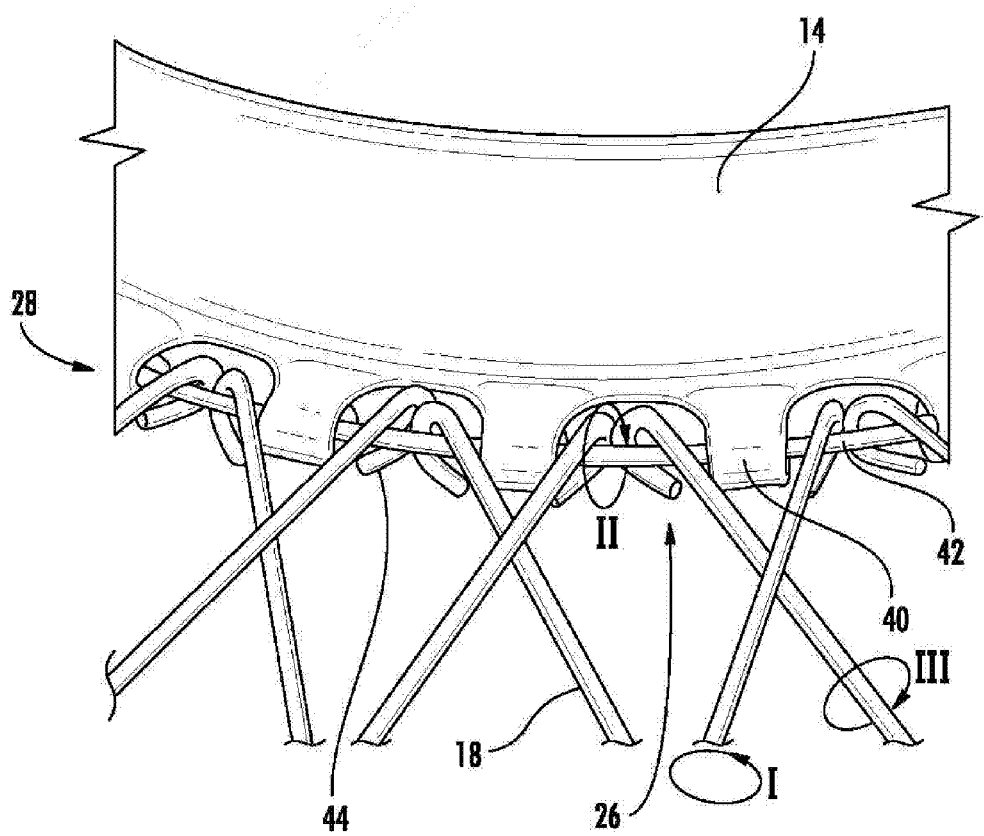
FIG. 2 is a detail view of a portion of the compressible structure as shown in FIG. 1.

Referring to FIG. 2, the movable ring 14 may have an attachment wire 42 running along or near the movable ring attachment circumference 28. The attachment wire 42 may be held in place by a series of protruding crimps 40 which define cutout areas of the movable ring 14 through which the attachment wire 42 may be accessed. An attachment wire 42 may be held in place in other manners as well, such as by passing the attachment wire 42 through holes cut in the movable ring 14 (not shown) or repeatedly wrapping the attachment wire 42 around the movable ring 14 (not shown). The second end 26 of each connector 18 may be secured to the attachment wire 42 by means of a loop 44 in the second end 26. Because the loop 44 has an inner circumference substantially larger than the outer circumference of the attachment wire 42, the second end 26 is able to rotate about the attachment wire 42 with at least two degrees of freedom. Therefore, the method of attachment shown in FIG. 2 allows the second end 26 to rotate about the attachment wire 42 from left to right, or yaw (with respect to the page upon which FIG. 2 is shown and designated by arrow I) and from bottom to top, or pitch (with respect to the page upon which FIG. 2 is shown and designated by arrow II). It may be possible for the second end 26 to move slightly in a third degree of freedom (i.e., rotation along the axis of the connector 18 itself, or roll and designated by arrow III). It will be understood that different methods of attaching the connectors 18 to the base 16 and movable ring 14 may be used as long as they provide for at least two degrees of freedom. An example of an alternative attachment is a ball and socket joint (i.e., a spherical joint). It may be possible to use multiple joints in order to achieve two or more degrees of rotational freedom of the connectors 18 with respect to the base 16 and movable ring 14.

Figure 5:
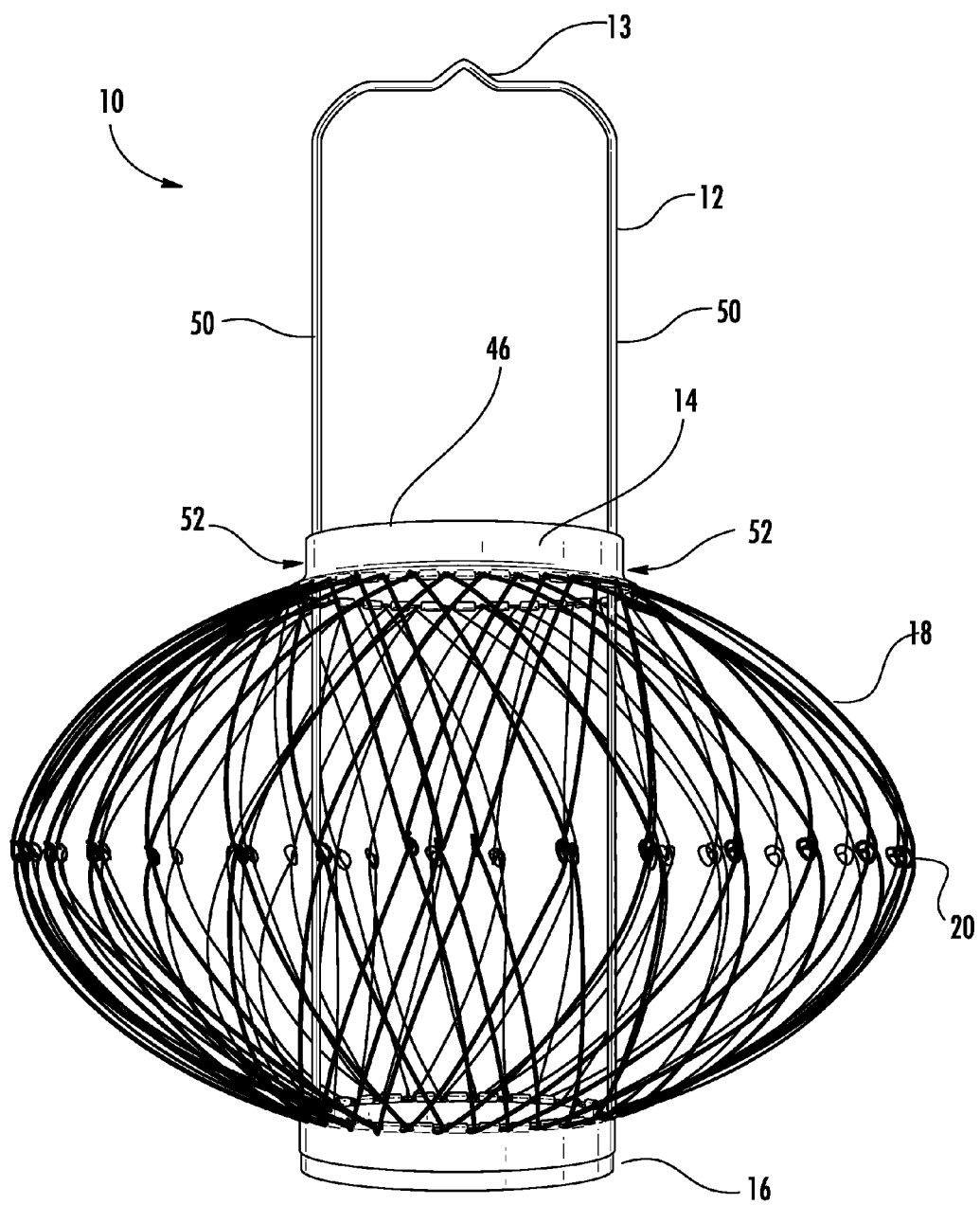
FIG. 5 is a perspective view of the compressible structure as shown in FIG. 1 in a compressed configuration.

As seen in FIGS. 1 and 5 generally, it will be understood that the first ends 22 of the connectors 18 may attach to the base 16 in a similar fashion as described above. Therefore, the base 16 may include protruding crimps or other features that are capable of retaining an attachment wire, as described above (not shown). As well, the base 16, like the movable ring 14 described above, may incorporate other methods of attaching the connectors 18 as long as the connectors 18 attach to the base 16 with at least two degrees of rotational freedom and zero degrees of translational freedom.

Figure 3:
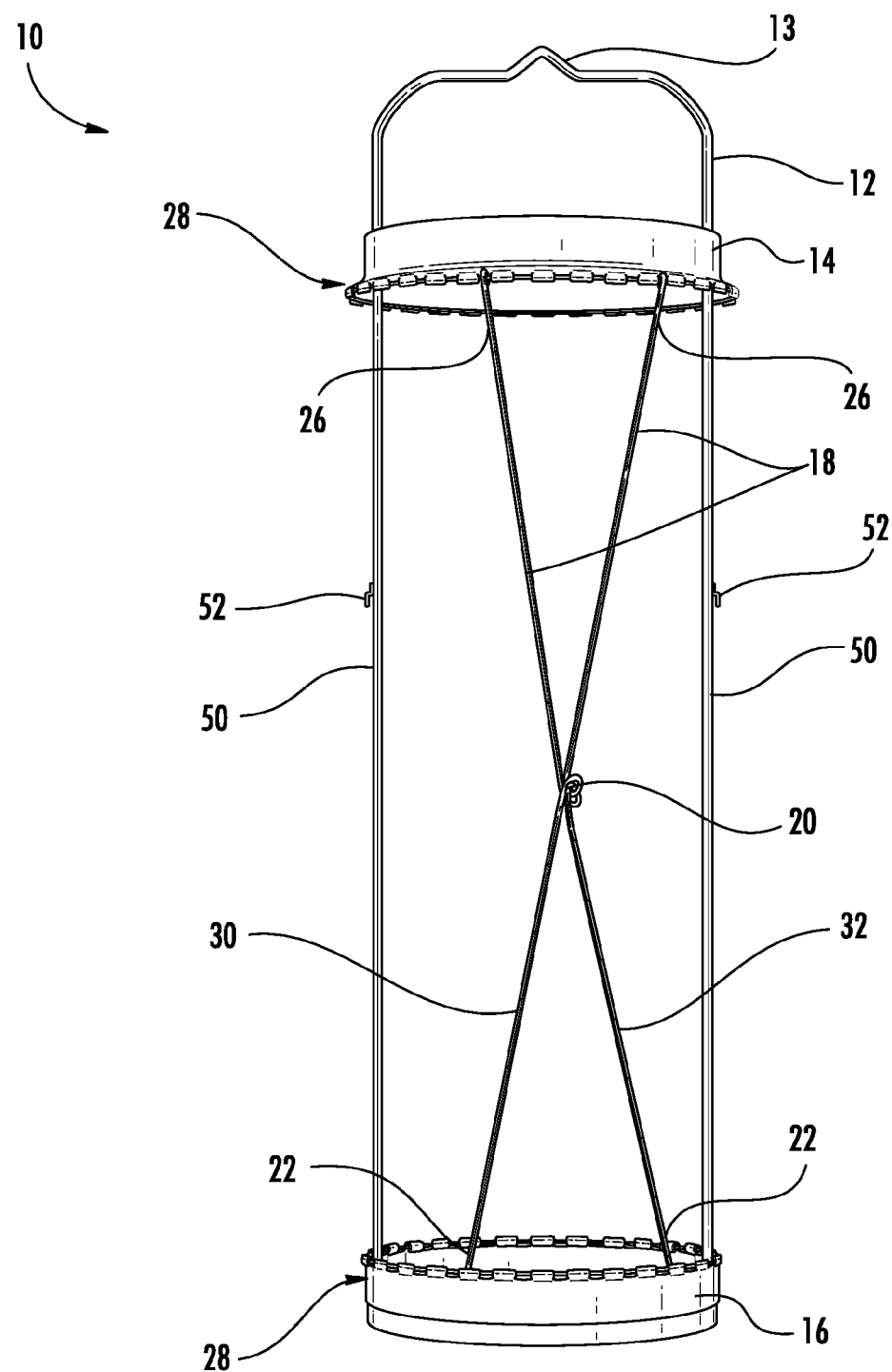
FIG. 3 is a perspective view of the compressible structure as shown in FIG. 1, showing only the base, movable ring, inner support, and two connectors.

FIG. 3 depicts an alternate view of a compressible structure 10 shown with only two connectors 18 in place. Referring to FIGS. 1 and 3, each connector 18 is attached between the base 16 and the movable ring 14 in a criss-cross (or X-shaped) fashion, such that the first end 22 of any one connector 18 is not located directly beneath the second end 26 of that connector 18. In this fashion, as shown in FIG. 1, approximately half of the connectors 18 form a series of approximately parallel lines slanted in a first direction, while the remaining connectors 18 form a series of approximately parallel lines slanted in an opposite direction. The criss-cross pattern is visually pleasing and visually distinct. Further, this orientation of connectors 18 and their degrees of freedom about the base 16 and movable ring 14 grant the compressible structure 10 unique and beneficial features. One such feature includes the ability for the compressible structure 10 to resemble a cylinder when in a non-compressed configuration, as shown in FIG. 1. The cylinder may have straight sides or the sides may exhibit a natural curve. As used herein, the term substantially straight is meant to encompass cylinders or other shapes having straight sides, as well as those whose sides that may have a natural curve. This term is meant to distinguish the structure between the compressed configuration (described in more detail below), where the sides of the cylindrical shape bow outward and away from the center, from the non-compressed configuration, where the sides of the cylindrical shape are not bowed outward. When the compressible structure 10 is in the non-compressed configuration, as shown in FIG. 1, the position of the movable ring 14 is known as the non-compressed position.

While the compressible structure has been described in the previous paragraph wherein the connectors are in a criss-cross (or X-shaped) pattern, the structure is not so limited. The structure may be implemented with other connector configurations. For example, the connectors may be configured with horizontal and vertical lines instead of them being diagonal.

Figure 4:
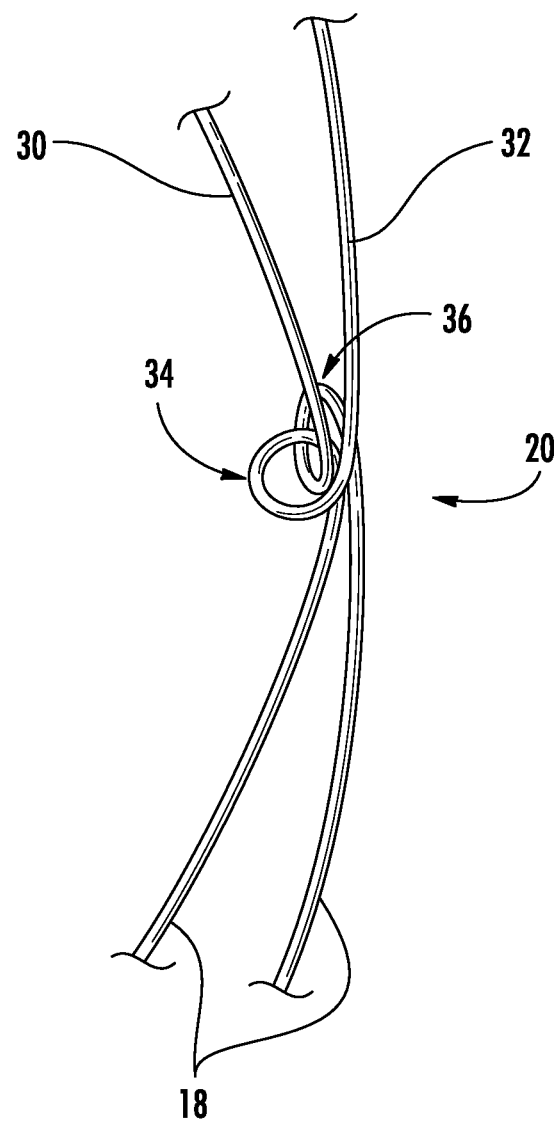
FIG. 4 is a detail view of a portion of the compressible structure as shown in FIG. 1.

Referring to FIG. 3, one can easily see how the connectors 18 are attached to the base 16 and movable ring 14 and how they cross approximately midway and are attached together at a junction point 20. Referring to FIGS. 1, 3, and 4, each connector 18 is joined to one other connector 18 at a junction point 20. In this fashion, the connectors 18 may be grouped into pairs of first connectors 30 and second connectors 32. The connectors 18 may be attached to the base 16 and movable ring 14 in such a fashion that the first end 22 of a first connector 30 is attached to the base 16 at a point nearly directly below where the second end 26 of a second connector 32 is attached to the movable ring 14. Additionally, the first end 22 of a second connector 32 may be attached to the base 16 at a point nearly directly below where the second end 26 of the first connector 30 is attached to the movable ring.

Referring to FIG. 4, a partial view of a pair of connectors 18 is shown at their junction point 20. The junction point 20 may be formed by a first loop 34 in a first connector 30 that interconnects with a second loop 36 in a second connector 32. This junction point 20 allows for the first connector 30 to rotate with respect to the second connector 32 to a certain extent, but ensures the first connector 30 and the second connector 32 remain translationally linked at the junction point 20. The junction point 20 ensures that the first connector 30 maintains zero degrees of translational freedom and one or more degrees of rotational freedom with the second connector 32. The junction point 20 ensures that the first connector 30 maintains at least two degrees of rotational freedom with the second connector 32.

The junction point 20 may include additional or different connection mechanisms or materials that ensure the first connector 30 and second connector 32 remain translationally linked. Such different junction points may include clamps, joints, linkages, adhesives, wire, rope, or other materials or mechanisms.

Referring back to FIG. 1, the connectors 18 may be formed of a resilient, semi-rigid material that is substantially biased to remain in a substantially straight shape, although the shape may include a natural curve. The material may be a metal, such as spring steel or a suitably rigid plastic, or may be any other material that can be temporarily bent but retains a tendency to return to a substantially straight shape. The material must have sufficient flexibility so that it does not remain bent or break when in the compressed position. Connectors 18 are resiliently attached to base 16 and movable ring 14. Connectors 18 will naturally tend toward being straight, providing a biasing force to force the decorative structure toward the non-compressed configuration. Retaining clips 52 (described below) are used to keep the connectors 18 bent or curved when the movable ring 14 is moved towards base 16 in the compressed configuration. The connectors 18 are resilient, such that when released from retaining clips 52, they return to their natural substantially straight shape that may include a natural curve.

Because the connectors 18 are attached to the base 16 and the movable ring 14 with at least two degrees of rotational freedom and because the connectors 18 are attached together in pairs at junction points 20 as described herein, the compressible structure 10 is compressed and uncompressed by moving the movable ring 14 towards and away from the base 16, respectively. When compressed, the connectors 18 tend to bend outwards in a spheroid shape because they are held translationally fixed with respect to the base 16 and movable ring 14 and because they are connected in pairs at junction points 20. Therefore, when the compressible structure 10 becomes compressed, it takes on the shape similar to a spheroid. At the beginning of the compression, the compressible structure takes on a shape similar to a prolate spheroid, which progresses to a shape similar to an oblate spheroid as the compressible structure 10 is further compressed. As shown in FIG. 5, the compressible structure 10 has been compressed such that it is in a shape similar to an oblate spheroid.

Figure 6A:
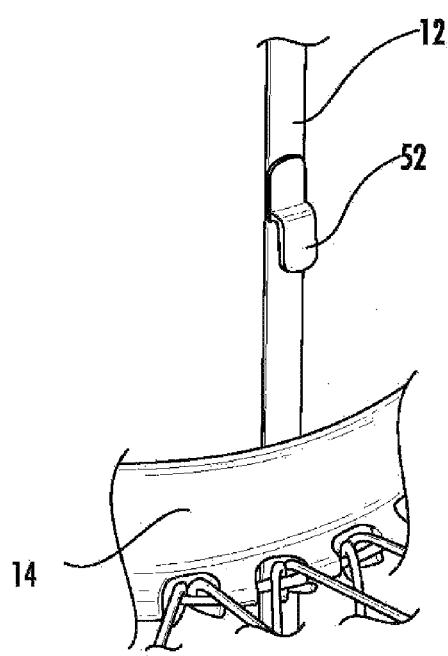
FIG. 6A is a detail view of a portion of the compressible structure as shown in FIG. 5.
Figure 6B:
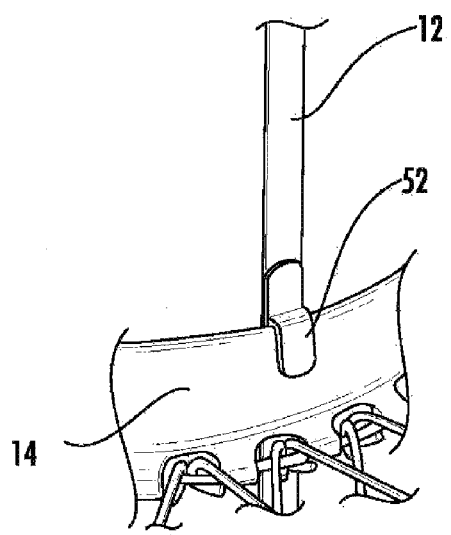
FIG. 6B is a detail view of a portion of the compressible structure as shown in FIG. 5.

Referring back to FIG. 1, because of each connector s 18 natural tendency to spring back to a substantially straight shape, the compressible structure 10 has a natural tendency to return to its non-compressed configuration and take the shape of a substantially straight cylinder. Referring again to FIG. 5, in order to maintain a spheroid shape, the movable ring 14 must be held translationally fixed with respect to the base 16 once the compressible structure has been moved into a compressed configuration. As shown in FIGS. 5 and 6B, when the movable ring 14 has been compressed towards the base 16, it can be retained in the compressed configuration by retaining clips 52. In this position, the movable ring 14 is considered to be in a compressed position. The retaining clips 52 are included with the inner support 12, and may be formed thereof or attached thereto. As shown in FIG. 5, each leg 50 of the inner support 12 may include a retaining clip 52, thus preventing the movable ring 14 from returning to the non-compressed configuration, as it has a natural tendency to do. Further, additional retaining clips 52 may be located along inner support 12 at positions above those shown in FIG. 5 to provide for positions in between the compressed and non-compressed configurations to permit partially compressed configurations, as desired. The retaining clips 52 fit over the lip of the movable ring 14 in order to keep it from moving further away from the base 16 and keep the compressible structure in the compressed configuration.

To move compressible structure 10 from the non-compressed configuration to the compressed configuration, the user will push movable ring 14 down along inner support 12 towards base 16, past retaining clips 52. Once past retaining clips 52, the movable ring 14 will engage retaining clips 52 to hold the movable ring 14 in place and keep it from returning to the top of inner support 12. A user may provide pressure to the legs 50 of the inner support 12 in order to bend them together slightly such that the movable ring 14 may clear the retaining clips 52 as it is moving towards the base 16. Alternatively, the retaining clips 52 or movable ring 14 may be configured such that the act of moving the movable ring 14 towards and past the retaining clips 52 from a non-compressed configuration naturally causes the legs 50 of the inner support 12 to bend inwards slightly, allowing the movable ring 14 to clear the retaining clips 52.

To return compressible structure 10 to the non-compressed configuration, the user will press down on movable ring 14 until it disengages retaining clips 52. Movable ring 14 is then permitted to slide back up inner support 12, while slight inward pressure is applied on inner support 12 to prevent movable ring 14 from reengaging retaining clips 52. The natural tendency of connectors 18 to return to their straightened position will force movable ring 14 up and away from base 16 to the non-compressed configuration.

Referring to FIG. 3, the inner support 12 may be securely attached to the base 16 to form a single rigid structure. The inner support 12 includes retaining clips 52. Referring to FIGS. 3 and 5, it will be understood that the location of the retaining clips 52 along the inner support 12 may be changed in order to permit the movable ring 14 to be held at a different desired distance from the base 16 when in a compressed configuration. As noted above, the inner support 12 may include two or more sets of retaining clips 52 located at different distances from the base 16, permitting a user to position and retain the movable ring 14 at varying distances from the base 16 by choosing which set of retaining clips 52 to employ. Also, the retaining clips 52 may be removably or slidably attached to the inner support 12 in such a fashion that they may be repositioned at varying distances from the base 16 and then locked or secured into place (e.g., such as by use of clamping action, pin-in-hole combinations, locking mechanisms, or other methods).

Figure 7A:
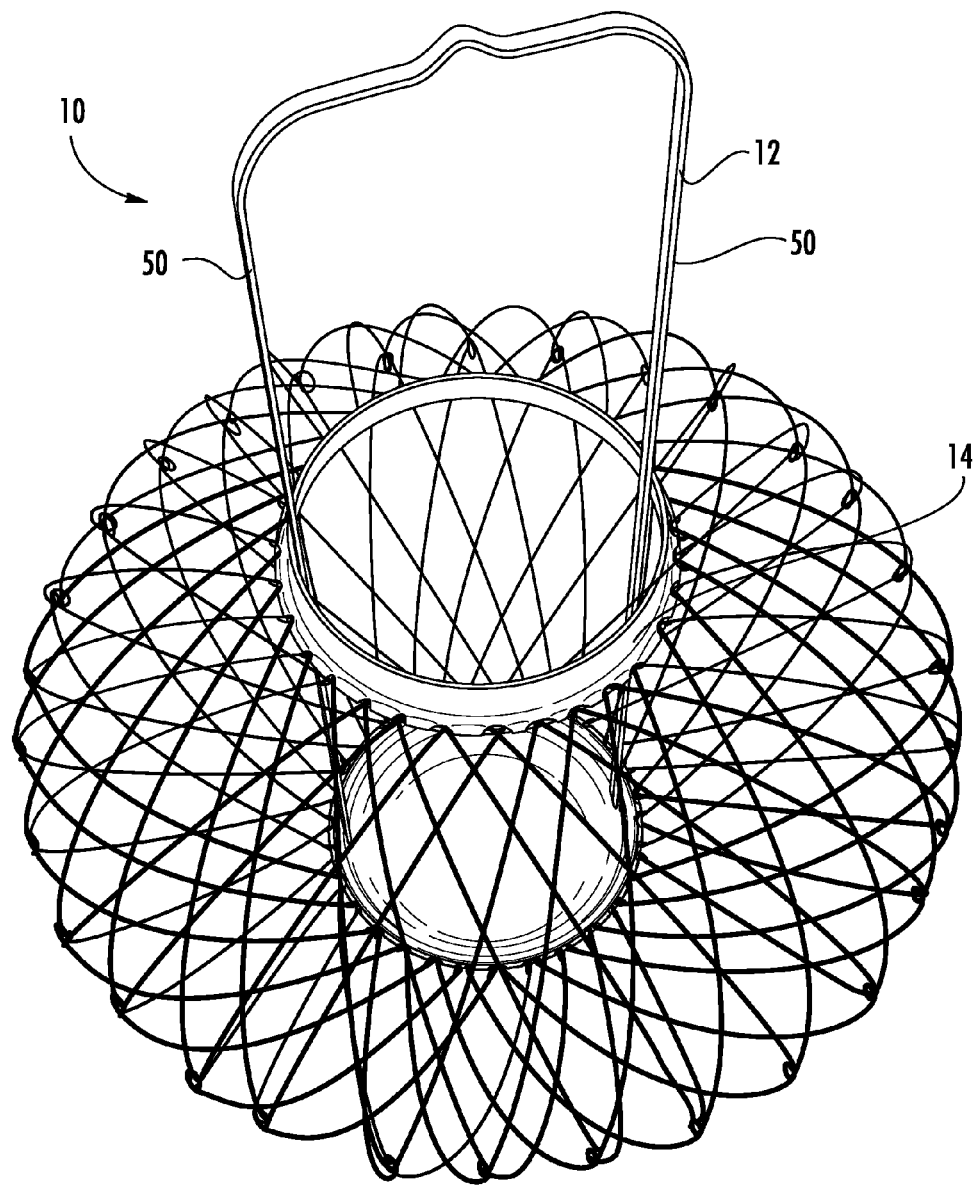
FIG. 7A is a partial overhead view of the compressible structure as shown in FIG. 5.

Referring to FIG. 7A, the movable ring 14 includes a central aperture, allowing access to the inside of the compressible structure 10. The legs 50 of the inner support 12 being located or attached to the periphery of base 16 permits the center of the compressible structure 10 to be substantially unobstructed. The central aperture permits ease of access into the center of the compressible structure 10 to permit accessories to be inserted within the compressible structure 10, and also provides a mounting point for any accessories.

Figure 7B:
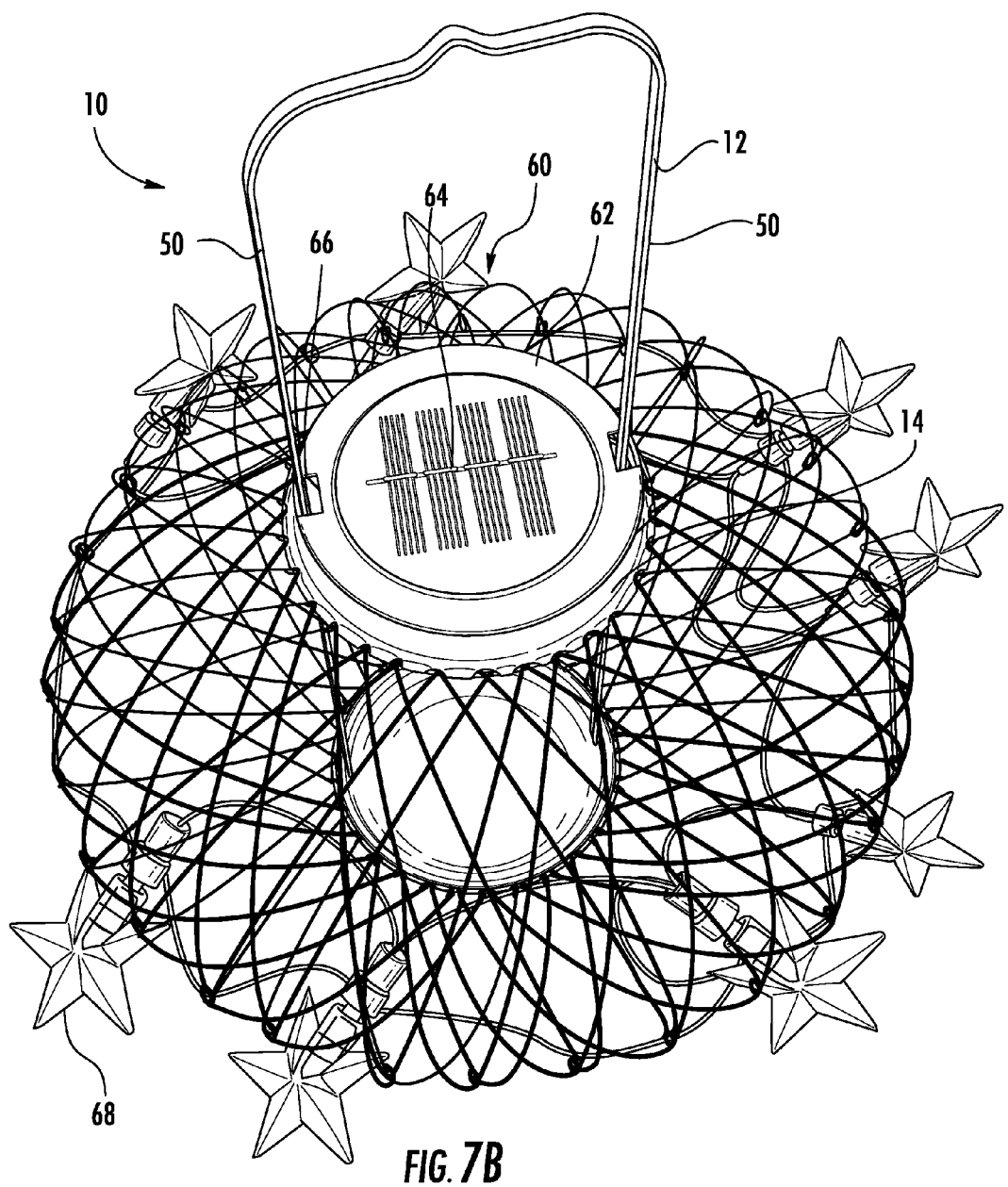
FIG. 7B is a partial overhead view of the compressible structure shown in FIG. 5 with a solar lantern accessory.

Referring to FIG. 7B, a solar lantern accessory 60 is shown inserted into the aperture of the movable ring 14. The solar lantern accessory 60 includes a solar panel 64 located within an accessory cap 62, a switch (not shown), and one or more lights 68. The lights 68 may be LED or similar lights. The lights 68 may include clips or attachment points that allow the lights 68 to be secured to the connectors 18. The accessory cap 62 may fit within the aperture of the movable ring 14. Alternatively, the accessory cap 62 may be otherwise attached to the movable ring 14 and may or may not completely fill the aperture of the movable ring 14. The accessory cap 62 includes openings 66 through which the legs 50 of the inner support 12 pass. The openings 66 are necessarily large enough that the legs 50 of the inner support 12 and the retaining clip 52 thereon can pass through with ease. The openings 66 are equal in number to the number of legs 50 of the inner support 12 and positioned so that the legs 50 of the inner support 12 may pass through the openings 66 when the accessory cap 62 is fit within the aperture of the movable ring 14. During installation, the lights 68 of the solar lantern accessory 60 may be inserted into the center of the compressible structure 10 first, after which the accessory cap 62 may be fit into place within the movable ring 14. The accessory cap 62 may be secured within the movable ring 14 by friction force or any other attachment mechanism, including adhesives, clips, clasps, or other methods. The accessory cap 62 may be removably secured within the movable ring 14, permitting it to be removed as necessary for maintenance, to access the interior of the compressible structure 10, or for other needs.

While the accessory cap 62 shown in FIG. 7B is a solar lantern accessory 60, it is contemplated that other accessory caps 62 with different features may be employed. Such accessory caps 62 may include decorative caps, accessory caps designed to provide feed for birds or other animals, accessory caps designed to collect water or provide for other weather monitoring needs, accessory caps designed to produce light or contain a light-producing element (e.g., by battery power, mains power, chemical reaction, non-powered glowing materials, fire, or other lighting methods), or accessory caps with other features. Due to the shape of the compressible structure 10, it will be understood that accessory caps may include separable or integral portions that fit within the center of the compressible structure 10 or above the accessory cap 62 (i.e., not within the center of the compressible structure 10).

Figure 8:
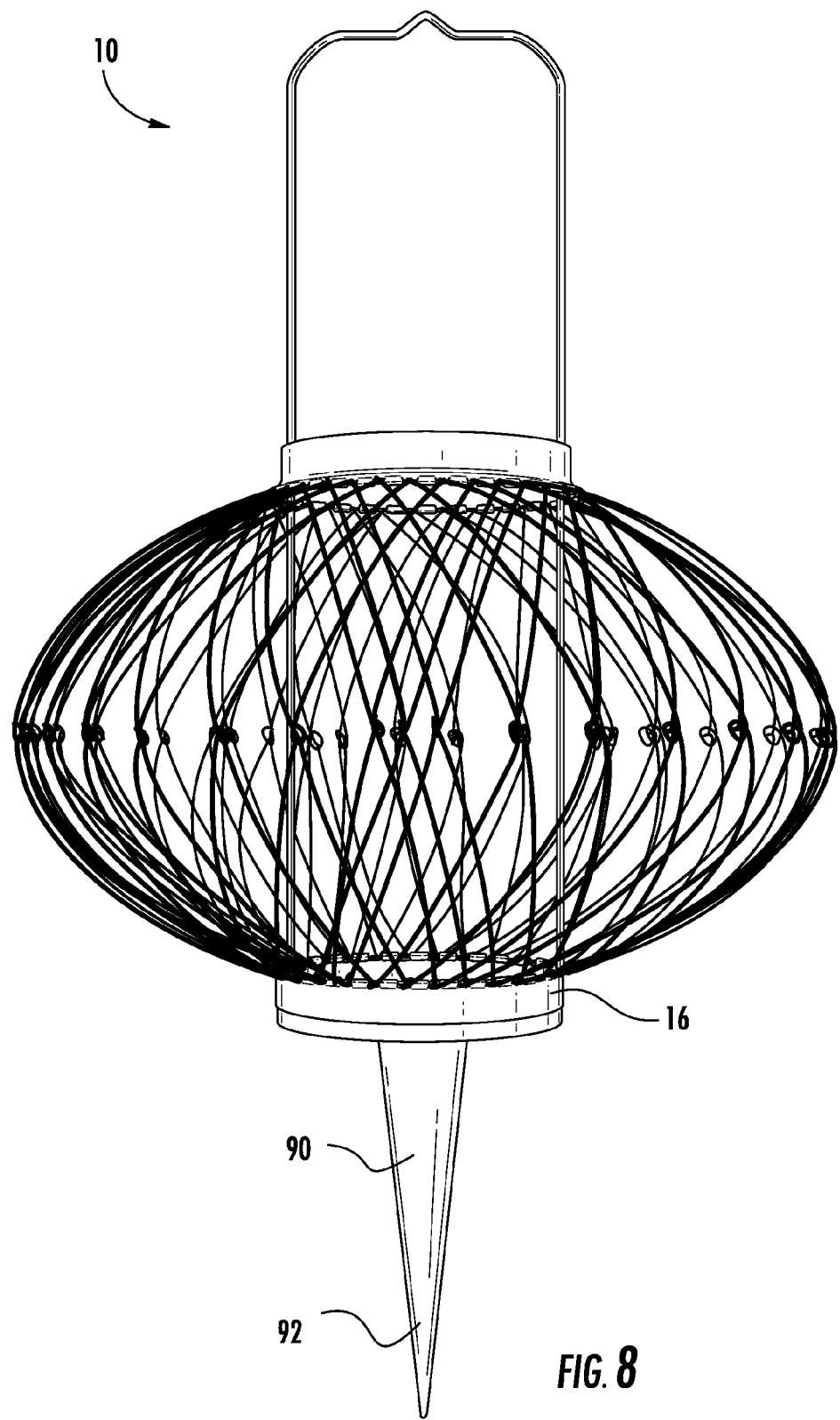
FIG. 8 is a perspective view of the compressible structure as shown in FIG. 5 with a ground stake accessory.
Figure 9A:
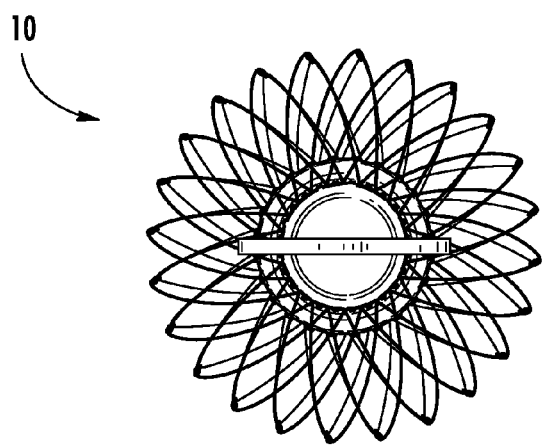
FIG. 9A is a top view of the compressible structure as shown in FIG. 5.
Figure 9B:
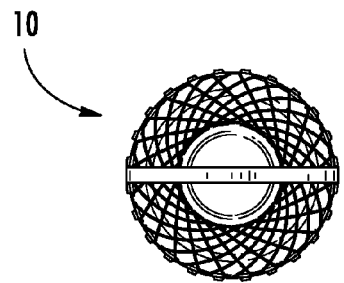
FIG. 9B is a top view of the compressible structure as shown in FIG. 1.
Figure 9C:
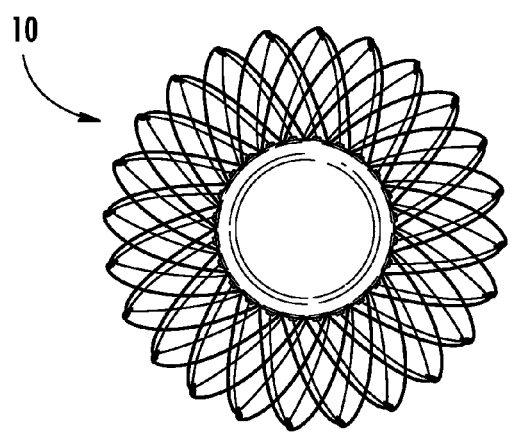
FIG. 9C is a bottom view of the compressible structure as shown in FIG. 5.
Figure 9D:
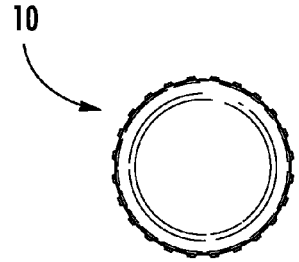
FIG. 9D is a bottom view of the compressible structure as shown in FIG. 1.

Referring to FIG. 8, an embodiment of the compressible structure 10 is shown with an accessory attachment 90 attached to the base 16. The accessory attachment 90 is a ground stake 92. The ground stake 92 is designed to allow the compressible structure 10 to be securely placed in a material, such as dirt, sand, soil, or other such materials. The ground stake 92 may be of any length necessary and may include non-tapered portions. Other accessory attachments 90 may be available to attach to the base 16 of the compressible structure 10.

Figure 10:
FIG. 10 is a perspective view of the compressible structure as shown in FIG. 5 with a floatable base.

Referring to FIG. 10, an embodiment of the compressible structure 10 is shown with a floatable base structure 100. The floatable base structure 100 can be a separate accessory type attachment to base 16 or it can be integrally formed with base 16. Floatable base structure 100 would be formed of a material, such as plastic or the like, that is designed to float on the surface of water, such as in a pond or small pool. The floatable base structure 100 could be of a variety of shapes, such as circular or square. It is important that the floatable base structure 100 be configured to provide sufficient stability to prevent compressible structure 10 from blowing over in the wind.

Figure 11:
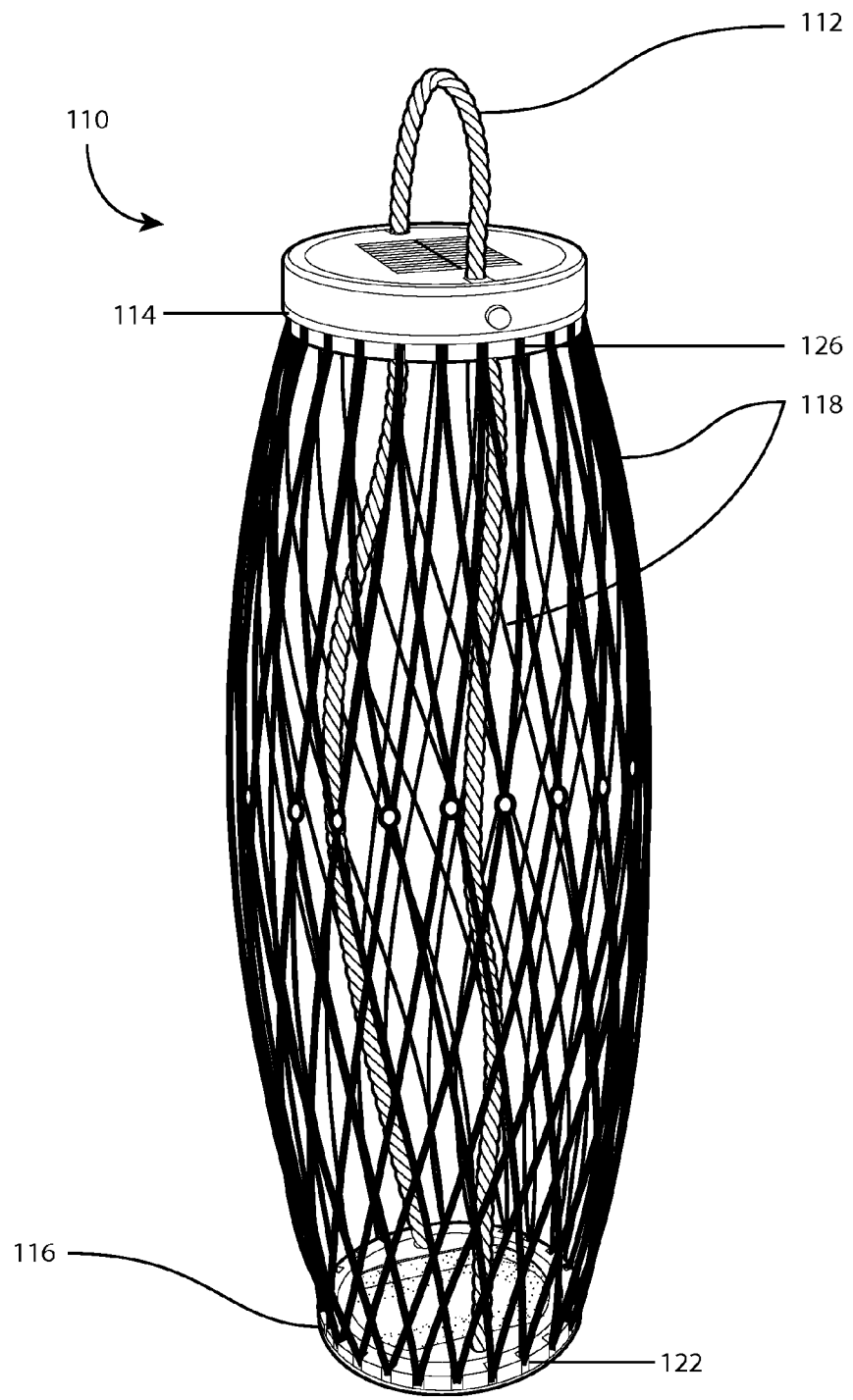
FIG. 11 is a perspective view of an embodiment of the compressible structure in a non-compressed configuration.

Referring to FIG. 11, another implementation of a compressible structure 110 is shown in a non-compressed configuration. The compressible structure 110 includes a base 116, a rope 112, and a top cover 114. The base 116 and top cover 114 shown are generally round in shape. The base 116 and top cover 114 may also be generally polygonal in shape and may be different in shape from one another (not shown). The rope 112 may be formed of twine, nylon, string, or similar material. The rope 12 may be secured to the base 116 or may be knotted to fit through slots in the base 116. The rope 12 should be of sufficient strength to provide strong support, as described in greater detail below.

The compressible structure 110 further includes a plurality of connectors 118, each having a first end 122 attached the base 116 and a second end 126 attached to the top cover 114. The connectors 118 are flexible and will flex outward from the center of the compressible structure 110 when the structure 110 is compressed from a non-compressed configuration to a compressed configuration, as described below.

Figure 12:
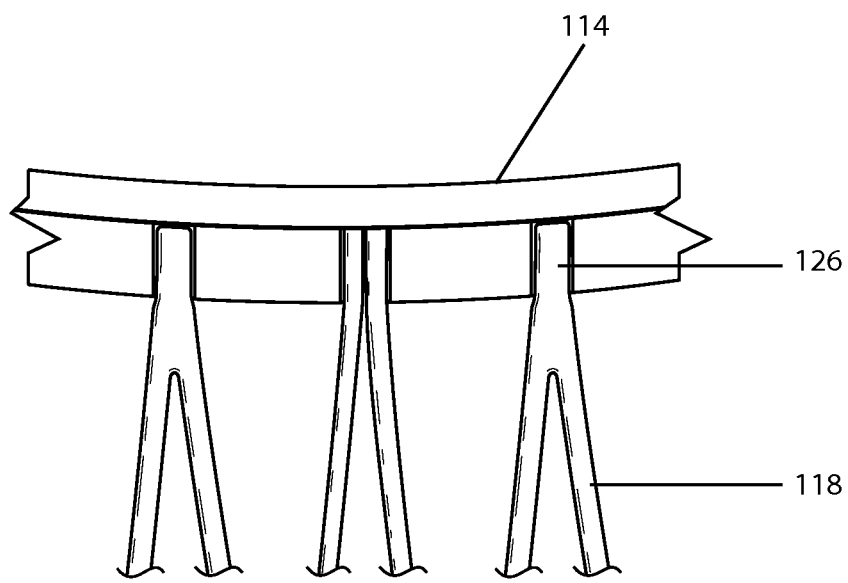
FIG. 12 is a detail view of a portion of the compressible structure as shown in FIG. 11.

FIG. 12 shows the second end 126 of the connectors 118 attached to the top cover 114. The attachment permits the connectors 126 to rotate or flex outward when the compressible structure 110 is compressed from the non-compressed configuration to the compressed configuration.

Figure 13:
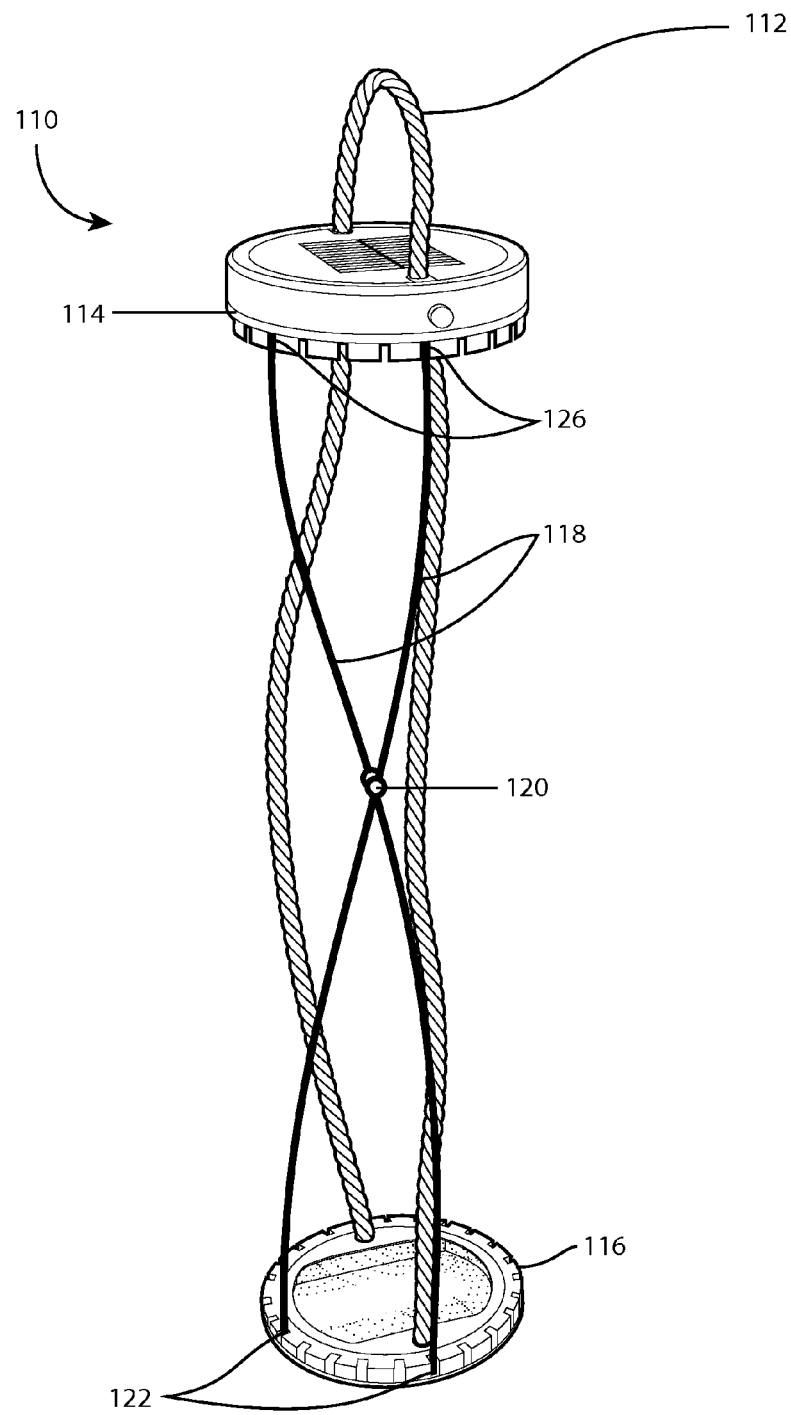
FIG. 13 is a perspective view of the compressible structure as shown in FIG. 11, showing only the base, rope, and two connectors.

FIG. 13 depicts an alternate view of a compressible structure 110 shown with only two connectors 118 in place. Referring to FIGS. 11 and 13, each connector 118 is attached between the base 116 and the top cover 114 in a criss-cross (or X-shaped) fashion, such that the first end 122 of any one connector 118 is not located directly beneath the second end 126 of that connector 118. In this fashion, as shown in FIG. 11, approximately half of the connectors 118 form a series of approximately parallel lines slanted in a first direction, while the remaining connectors 118 form a series of approximately parallel lines slanted in an opposite direction. The criss-cross pattern is visually pleasing and visually distinct. Further, this orientation of connectors 118 and their degrees of freedom about the base 116 and top cover 114 grant the compressible structure 110 unique and beneficial features. One such feature includes the ability for the compressible structure 110 to resemble a cylinder when in a non-compressed configuration, as shown in FIG. 11. The cylinder may have straight sides or the sides may exhibit a natural curve. When the compressible structure 110 is in the non-compressed configuration, as shown in FIG. 11, the position of the top cover 114 is known as the non-compressed position.

While the compressible structure has been described in the previous paragraph wherein the connectors are in a criss-cross (or X-shaped) pattern, the structure is not so limited. The structure may be implemented with other connector configurations. For example, the connectors may be configured with horizontal and vertical lines instead of them being diagonal.

Figure 14:
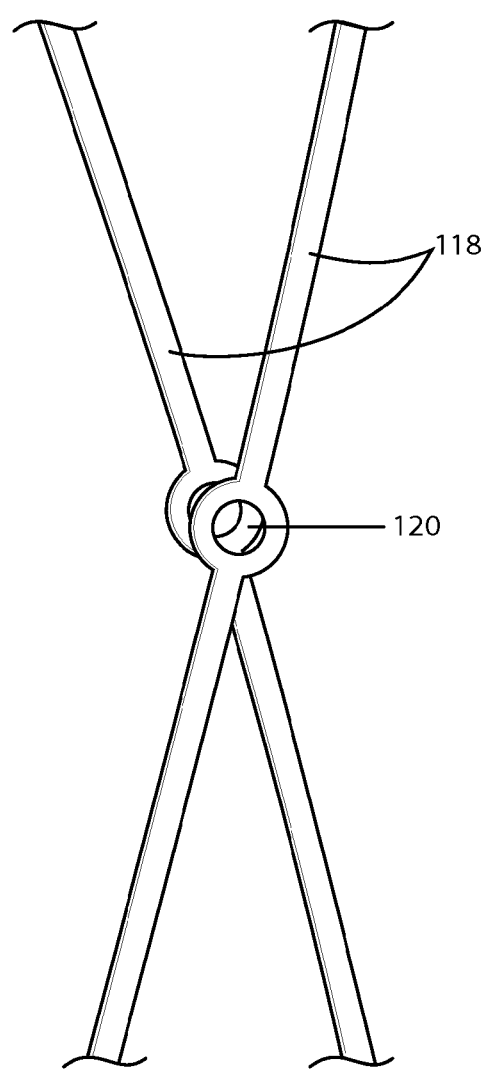
FIG. 14 is a detail view of a portion of the compressible structure as shown in FIG. 11.

Referring to FIG. 13, one can easily see how the connectors 118 are attached to the base 116 and movable ring 114 and how they cross approximately midway. At approximately this midway point, the connectors may include corresponding holes 120 or similar openings. These holes 120 can be used as openings for lights or similar accessories (shown in FIG. 16B). FIG. 14 shows a partial view of a pair of connectors 118 with the corresponding holes 120. As in the earlier implementation, the connectors 118 may be formed of a resilient, semi-rigid material that is substantially biased to remain in a substantially straight shape, although the shape may include a natural curve. The material may be a metal, such as spring steel or a suitably rigid plastic, or may be any other material that can be temporarily bent but retains a tendency to return to a substantially straight shape. The material must have sufficient flexibility so that it does not remain bent or break when in the compressed position. Connectors 118 are resiliently attached to base 116 and top cover 114. Connectors 118 will naturally tend toward being straight, providing a biasing force to force the decorative structure toward the non-compressed configuration.

Figure 15A:
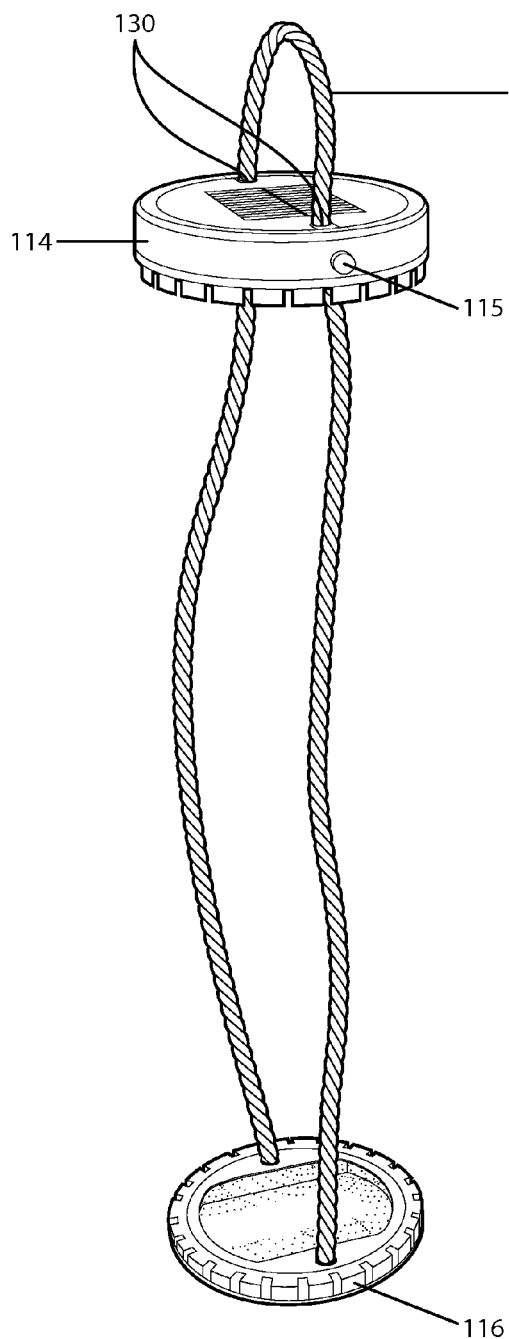
FIG. 15A is a perspective view of the compressible structure as shown in FIG. 11 in a non-compressed configuration, showing only the base and rope.
Figure 15B:
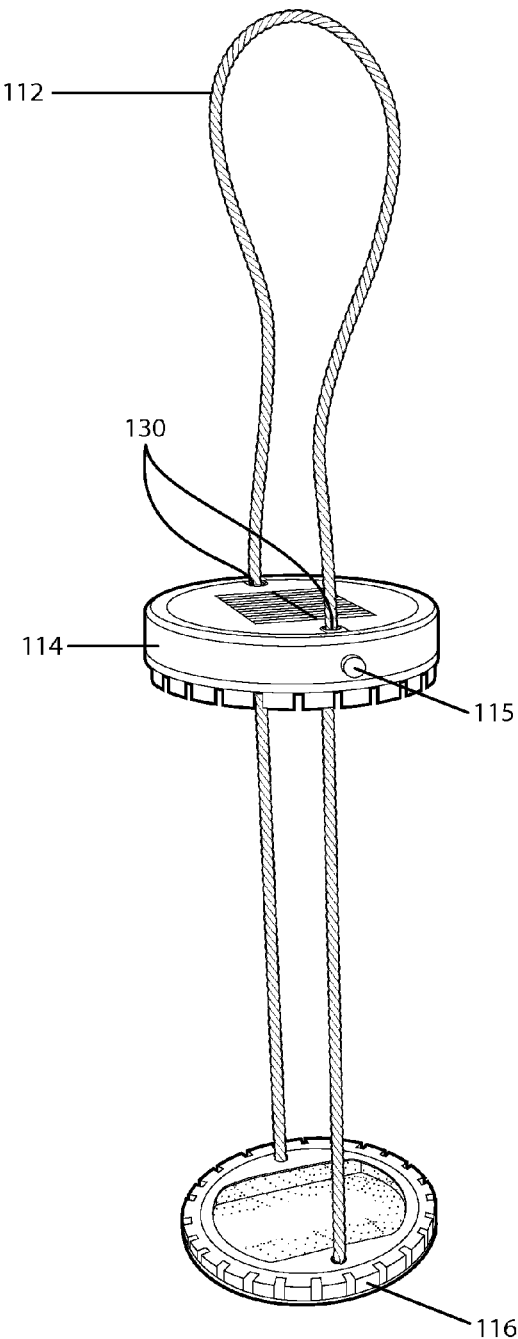
FIG. 15B is a perspective view of the compressible structure as shown in FIG. 11 in a compressed configuration, showing only the base and rope.

FIG. 15 shows the top cover 114 moving along rope 112 with the connectors removed. FIG. 15A shows the ring 114 near the top of rope 112 and FIG. 15B shows the ring 114 in the middle of rope 112. The top ring 112 can slide along the rope 112 when the tension is removed by pressing the buttons 115, located on either side of the top ring 112. In this way, the top cover 114 can move from the compressed configuration to the non-compressed configuration. The mechanism is described further in FIG. 20 below.

Figure 16A:
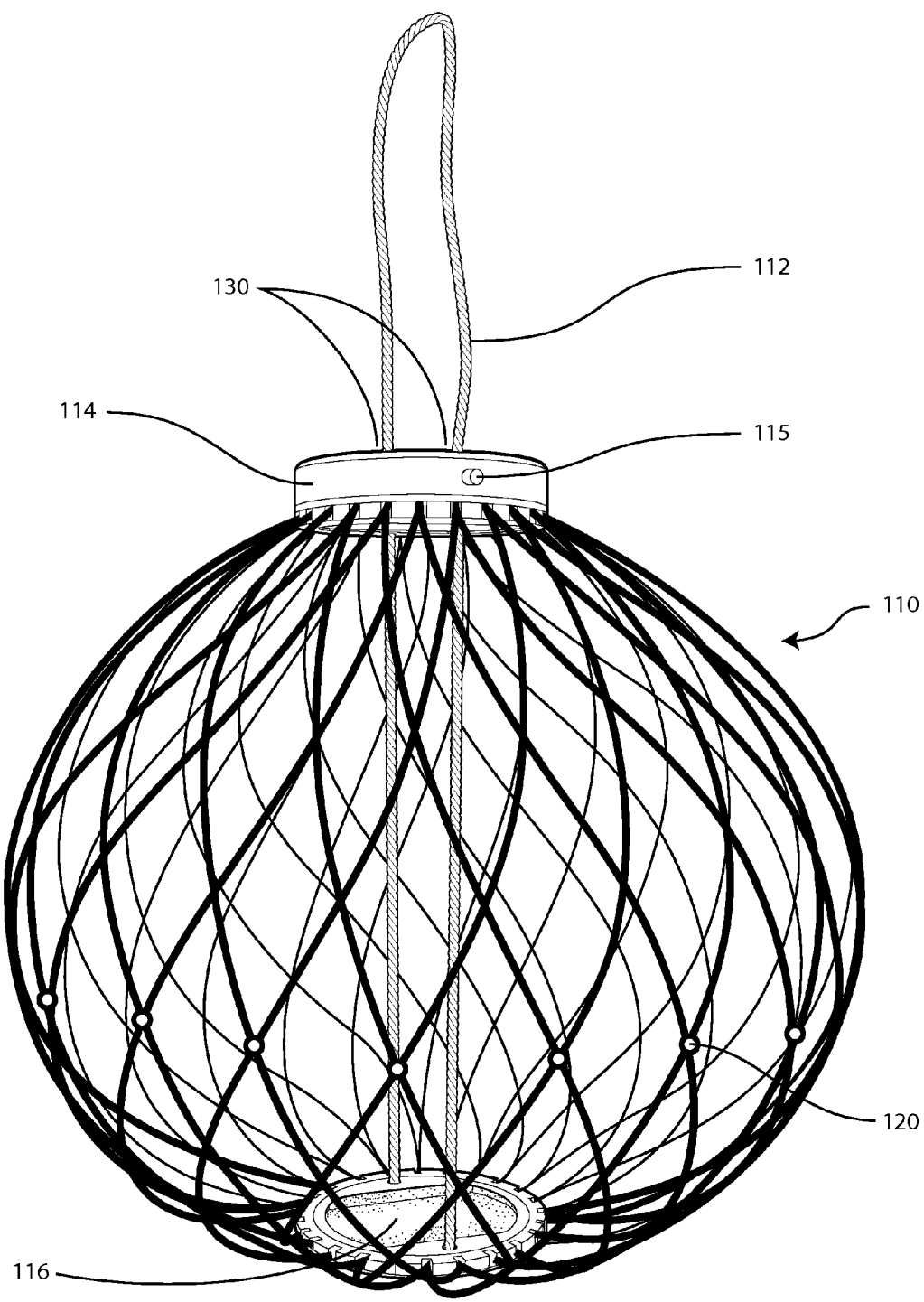
FIG. 16A is a side view of the compressible structure as shown in FIG. 11 in a compressed configuration.
Figure 20:
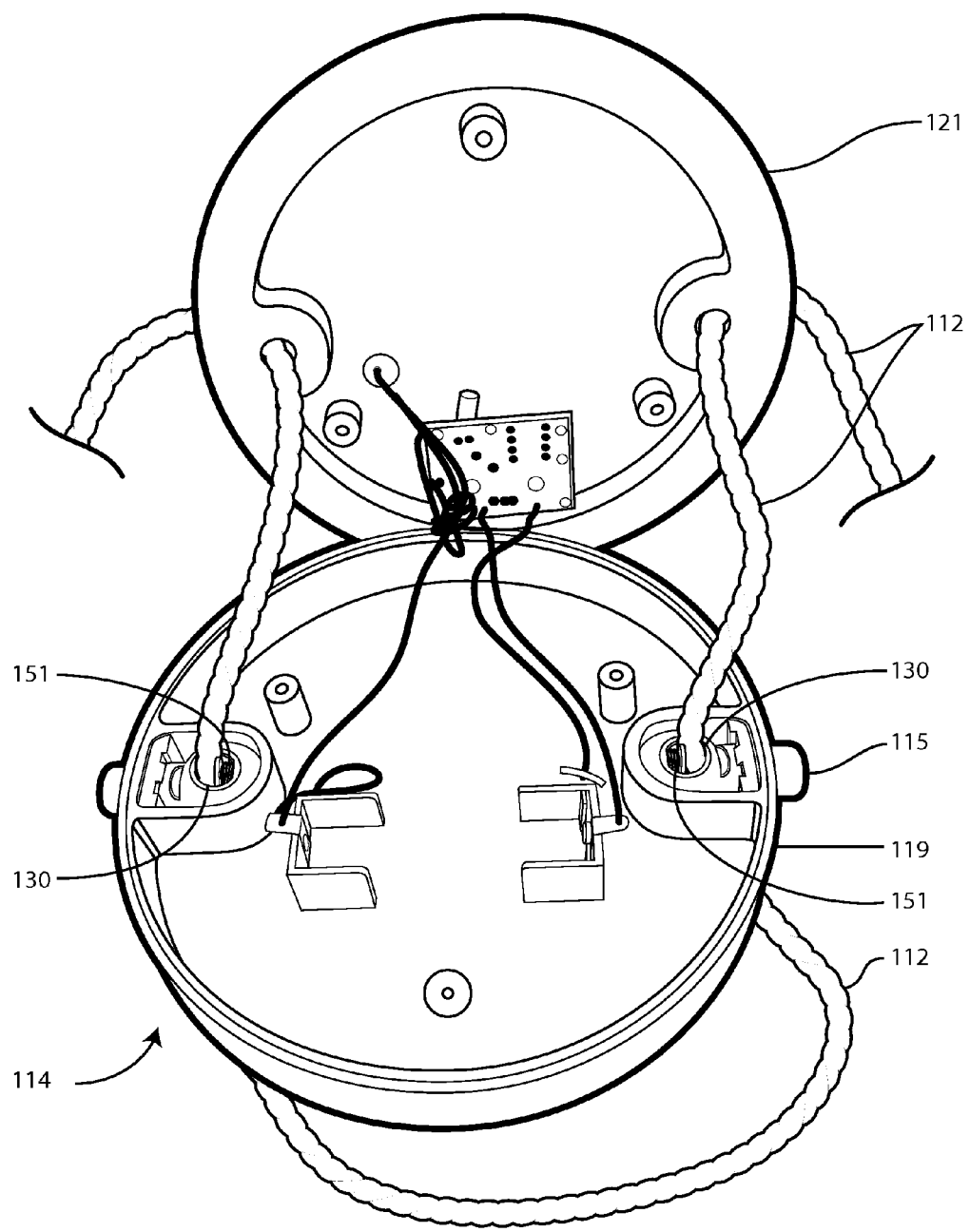
FIG. 20 is a view of the inside of the top cover of the compressible structure as shown in FIG. 11.

Referring again to FIG. 16A, in order to maintain a spheroid shape, the top cover 114 must be held translationally fixed with respect to the base 116 once the compressible structure has been moved into a compressed configuration. As shown in FIG. 20, when the rope 112 passes through top cover 114, it passes through openings 130 therethrough. Each opening 130 includes a mechanism for holding the top cover 114 in place with respect to the rope 112. In the implementation shown in FIG. 20, the rope is held in place by spring 151 that presses the rope 112 against the sides of the opening 130. The spring 151 can be released by pressing button 115. This releases the tension on the spring and permits the top cover 114 to slide along the rope 112. In use, both buttons 115 would typically be pressed simultaneously to slide the entire top cover 114 along the rope to move the structure 110 between the compressed configuration and the uncompressed configuration. The fact that the top cover 114 can slide anywhere along the rope 112 provides the freedom for the structure 110 to have many configurations between the compressed configuration and the uncompressed configuration, as desired by the user.

Figure 16B:
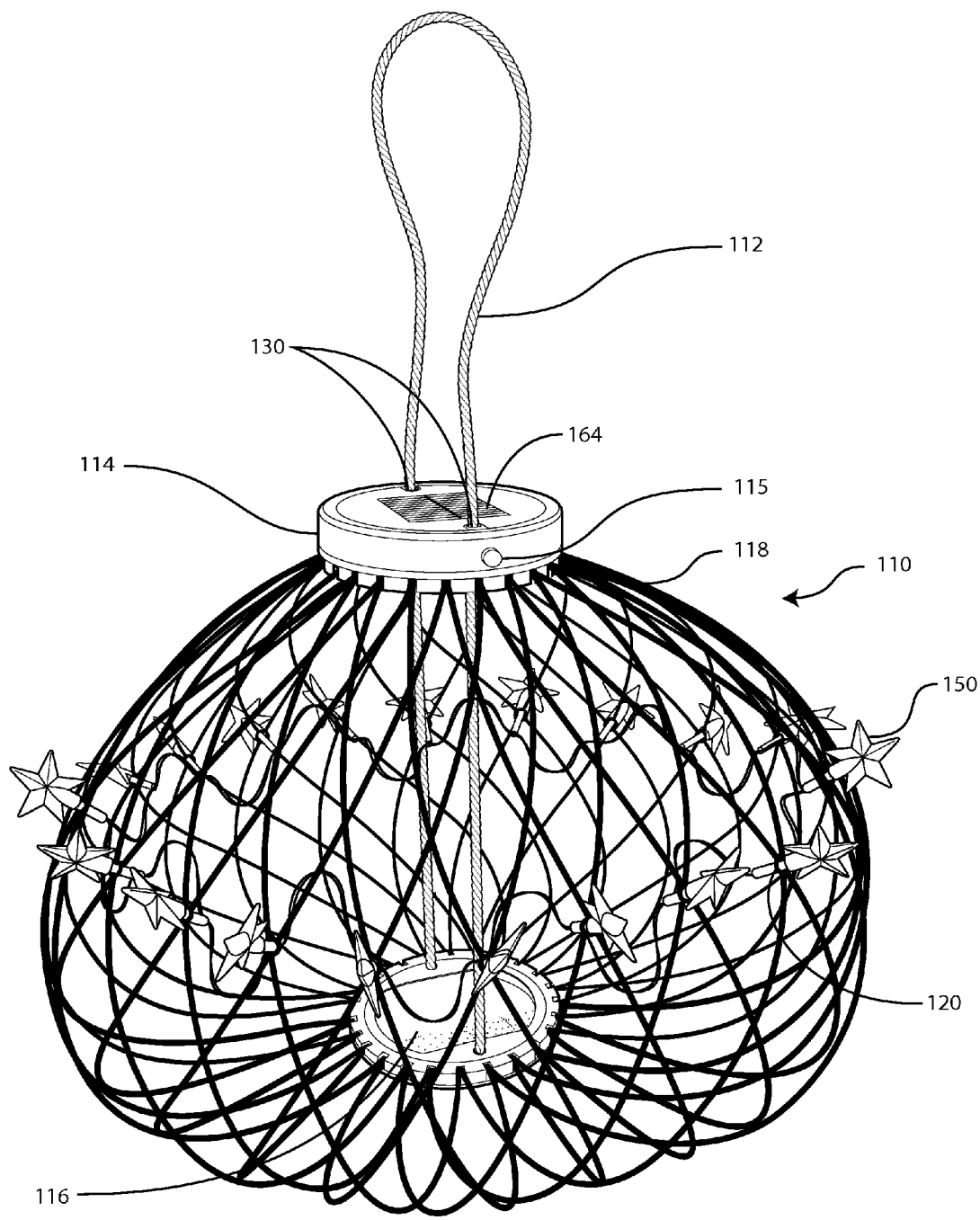
FIG. 16B is a side view of the compressible structure as shown in FIG. 11 in a compressed configuration including a strand of lights.

Referring to FIG. 16B, the compressible structure 110 may include optional decorative lights 150 located on strands within the structure 110. The lights 150 can be attached to the connectors 118 through the holes 120 or by clips or other retaining mechanisms. The addition of lights 150 permits the structure 110 to be used as a solar lantern. The solar lantern includes a solar panel 164 located within an accessory cap, a switch (not shown), and one or more lights 150. The lights 150 may be LED or similar lights.

Figure 17:
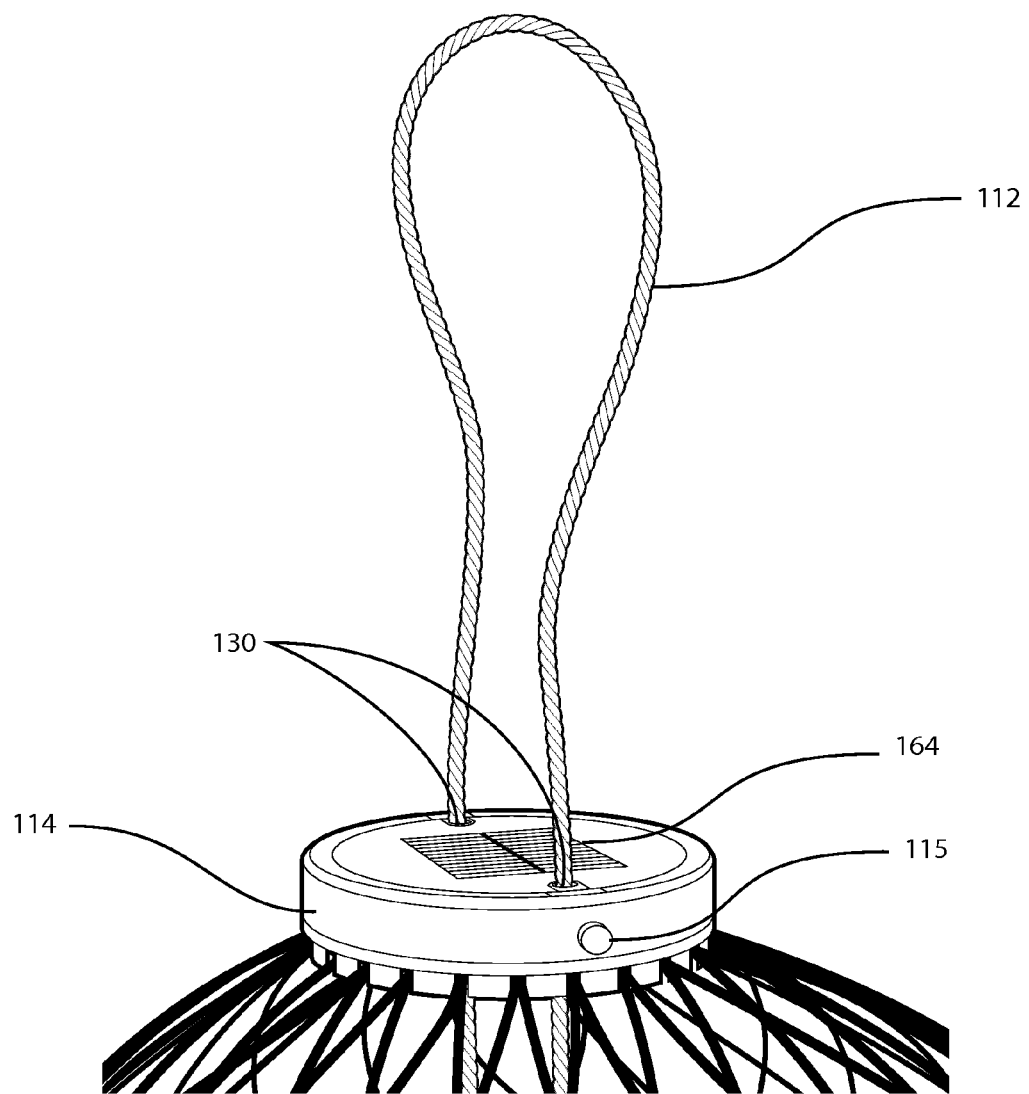
FIG. 17 is a detail view of a portion of the compressible structure as shown in FIG. 11.
Figure 18:
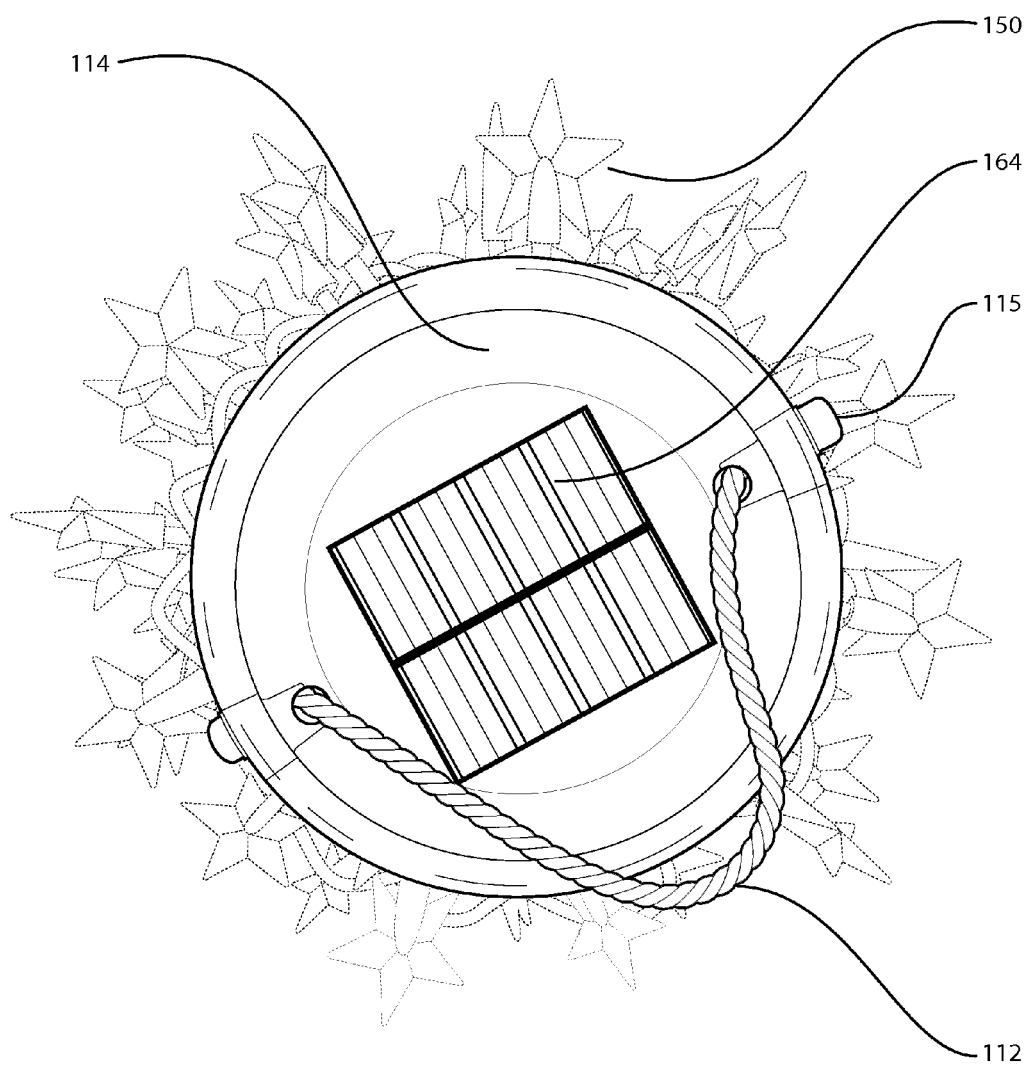
FIG. 18 is an overhead view of the compressible structure as shown in FIG. 11.

FIG. 17 is another view of the top portion of the compressible structure. FIG. 18 is an overhead view of the compressible structure. The rope 112 is shown extended through the openings 130 in the top cover 114. The optional lights are shown in FIG. 18 and the solar panel 164 is located in the top surface of the top cover 114.

Figure 19:
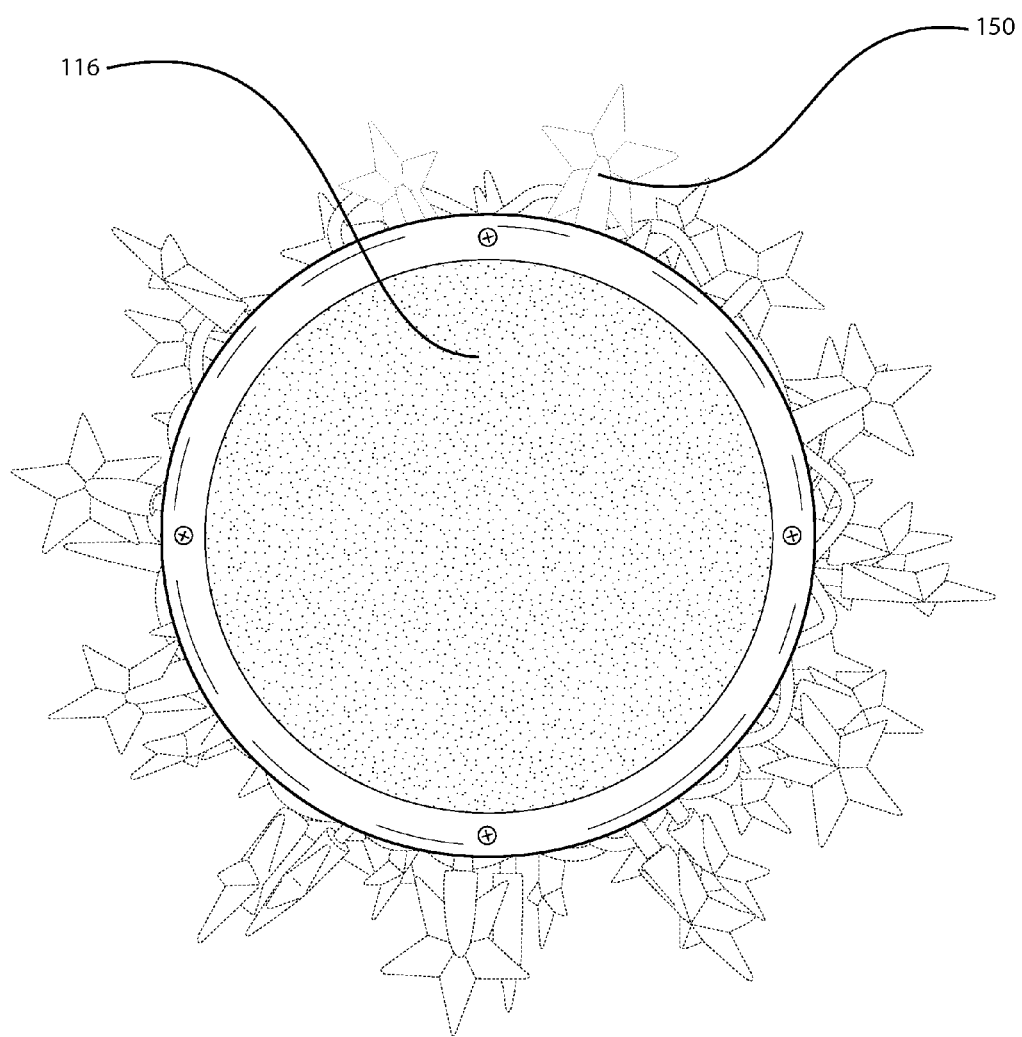
FIG. 19 is a bottom view of the compressible structure as shown in FIG. 11.

FIG. 19 shows a bottom view of the compressible structure. The base 116 is shown with the optional lights 150 extending out from the structure.

FIG. 20 is a view of the inside of the top cover 114. The top cover 114 includes a compartment in which is located the internal components of the optional solar lighting system. These include the circuit board, connecting wires, and other components. The top cover 114 can include a compartment 119 and a panel 121 that is connected to the compartment 119 by screws or the like. To access the inside of the top cover 114, the user could remove the screws and separate the compartment 119 from the panel 121.

The rope 112 is shown through openings 130 in the top cover 114. The rope 112 is held in place by springs 151 that compress the rope within the openings 130. To move the structure from the uncompressed configuration to the compressed configuration, a user would depress the buttons 115, thereby releasing the tension of the springs 151 against the rope 112. The rope 112 could then be pulled through the openings 130 and the structure compressed. Once the structure is in the desired configuration, the user would release the buttons 114, thereby restoring the tension of the springs on the rope 112 and holding the structure in place. In this way, the structure may be held in the compressed configuration, the uncompressed configuration, or at an intermediate point between the two.

It will be understood that the dimensions of the compressible structure and its various elements may be scaled up or down as necessary or desired.

The various parts described herein may be powder-coated or otherwise prepared to take on a particular color or other visual or textual characteristic.

While the invention has been described in conjunction with specific exemplary implementations, it is evident to those skilled in the art that many alternatives, modifications, and variations will be apparent in light of the foregoing description. Accordingly, the invention is intended to embrace all such alternatives, modifications, and variations that fall within the scope and spirit of the appended claims.

What is claimed is:

1. An article comprising:
a base;
an inner support attached to the base, the inner support including at least two legs;
a movable ring slidable along the at least two legs;
a plurality of connectors, each having a first end attached to the base and a second end attached to the movable ring, the connectors being naturally biased toward a non-compressed configuration where they are substantially straight and being bendable into a compressed configuration;
at least one retaining clip on each leg for engaging the movable ring when in the compressed configuration; and
a solar lantern accessory cap associated with the movable ring and configured to be fit within an aperture of the movable ring and wherein the accessory cap includes a first opening and a second opening configured to allow passage of the legs and the retaining clips, the accessory cap including a solar panel and a light.

2. The article of claim 1, wherein the first end of each connector is translationally fixed to the base and has at least two degrees of freedom of rotation with respect to the base, and the second end is translationally fixed to the movable ring and has at least two degrees of freedom of rotation with respect to the movable ring, each of the plurality of connectors is translationally fixed to one other of the plurality of connectors to form a pair of connectors at a junction point located between the base and the movable ring, and wherein the plurality of connectors are configured to apply a biasing force to force the movable ring towards the non-compressed configuration.

3. The article of claim 2, wherein the connectors rotate about the junction point.

4. The article of claim 2, wherein each of the plurality of connectors is translationally fixed to form a criss-cross shape with the one other of the plurality of connectors.

5. The article of claim 2, wherein each of the plurality of connectors is looped around the one other of the plurality of connectors with which it forms the pair.

6. The article of claim 1, wherein the second end of each of the plurality of connectors is attached to an attachment wire along the circumference of the movable ring.

7. The article of claim 1, wherein the movable ring includes a lip that engages the at least one retaining clip when in the compressed configuration.

8. The article of claim 1 resembling a substantially straight cylinder when in the non-compressed configuration and resembling an oblate spheroid when in the compressed configuration.

9. The article of claim 1, wherein the base includes an accessory attachment.

10. The article of claim 9, wherein the accessory attachment is a ground stake.

11. The article of claim 1, wherein the base comprises a floatable base structure that is separate from or integrally formed with the base.

12. An article comprising:
a base;
an inner support attached to the base, the inner support including at least two legs and a hanging point;
a movable ring slidable along the at least two legs and having an aperture;
a plurality of connectors, each having a first end attached to the base and a second end attached to the movable ring, the connectors being naturally biased toward a non-compressed configuration where they are substantially straight and being bendable into a compressed configuration, wherein the first end of each connector is translationally fixed to the base and has at least two degrees of freedom of rotation with respect to the base, and the second end is translationally fixed to the movable ring and has at least two degrees of freedom of rotation with respect to the movable ring, each of the plurality of connectors is translationally fixed to one other of the plurality of connectors to form a pair of connectors at a junction point located between the base and the movable ring, and wherein the plurality of connectors are configured to apply a biasing force to force the movable ring towards the non-compressed position;
at least one retaining clip on each leg for engaging the movable ring when in the compressed configuration; and
a solar lantern accessory cap associated with the movable ring, the accessory cap being configured to fit within the aperture of the movable ring and including a first opening and a second opening configured to allow passage of the legs and the retaining clips, the accessory cap including a solar panel and a light, the light being attachable to at least one of the connectors.

13. An article comprising:
a base;
a rope attached to the base at at least two separate points;
a top cover slidable along the rope and engaging the rope at at least two separate points;
a plurality of connectors, each having a first end attached to the base and a second end attached to the top cover, the connectors being naturally biased toward a non-compressed configuration where they are substantially straight and being bendable into a compressed configuration; and the top cover including at least one spring for providing tension on the rope to hold the rope in place with respect to the top cover.

14. The article of claim 13, further comprising lights that engage the plurality of connectors.

15. The article of claim 14, wherein the lights are LED lights.

16. The article of claim 14, further comprising a solar panel associated with the top cover, the solar panel providing power for the lights.

17. The article of claim 13 resembling a substantially straight cylinder when in the non-compressed configuration and resembling an oblate spheroid when in the compressed configuration.

* * * * *